Figure 1:
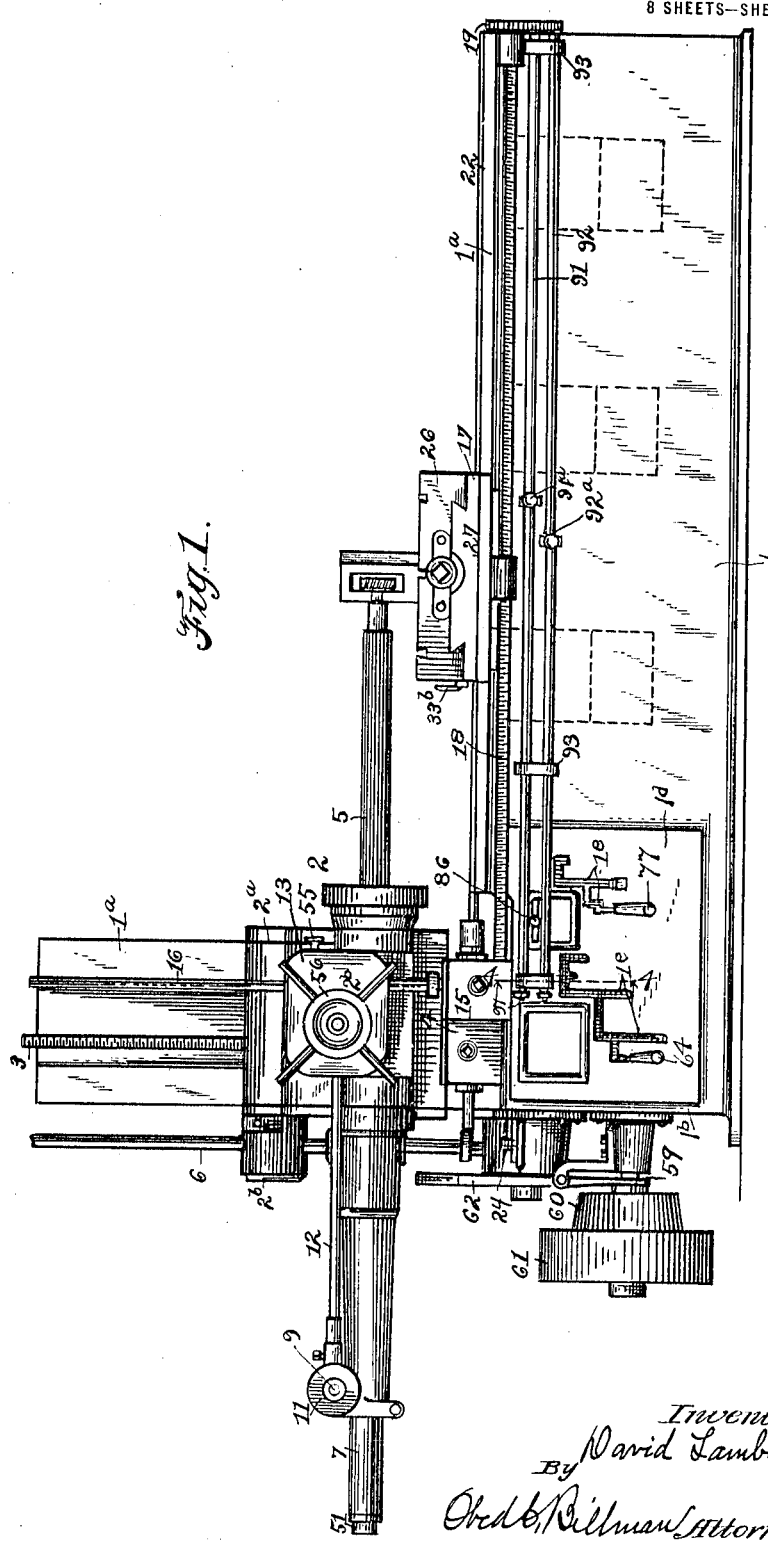

D. LAMBERT.
MACHINE TOOL.
APPLICATION FILED JULY 13, 1918.

1,316,961.

Patented Sept. 23, 1919.
8 SHEETS—SHEET 1.

Inventor:
David Lambert
By Ord E. Billman Attorney.

D. LAMBERT.
MACHINE TOOL.
APPLICATION FILED JULY 13, 1918.

1,316,961. Patented Sept. 23, 1919.
8 SHEETS—SHEET 3.

Inventor.
David Lambert
By
Chas. E. Pillman Attorney.

D. LAMBERT.
MACHINE TOOL.
APPLICATION FILED JULY 13, 1918.
1,316,961.
Patented Sept. 23, 1919.
8 SHEETS—SHEET 4.
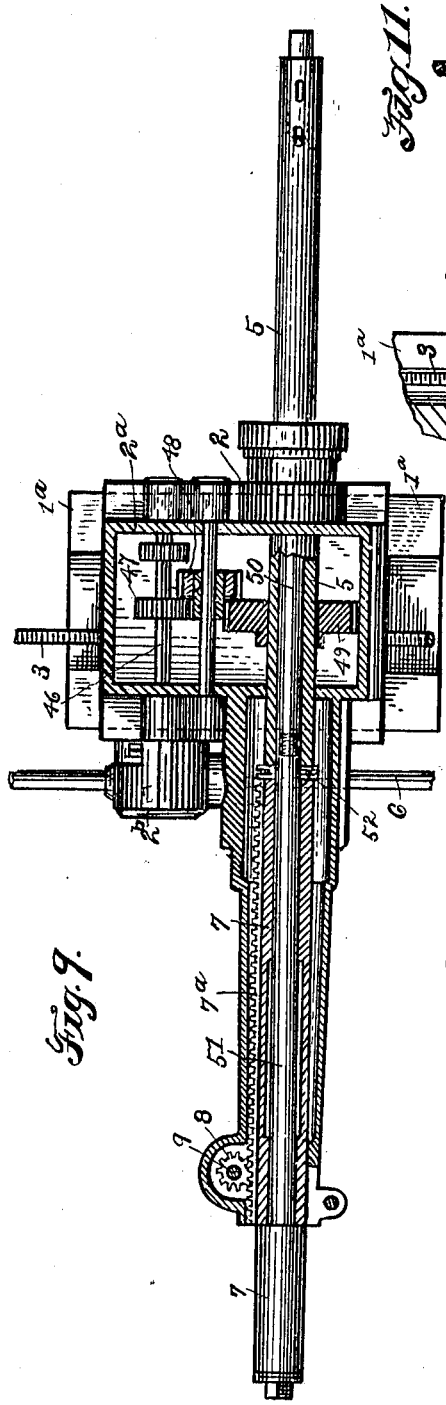

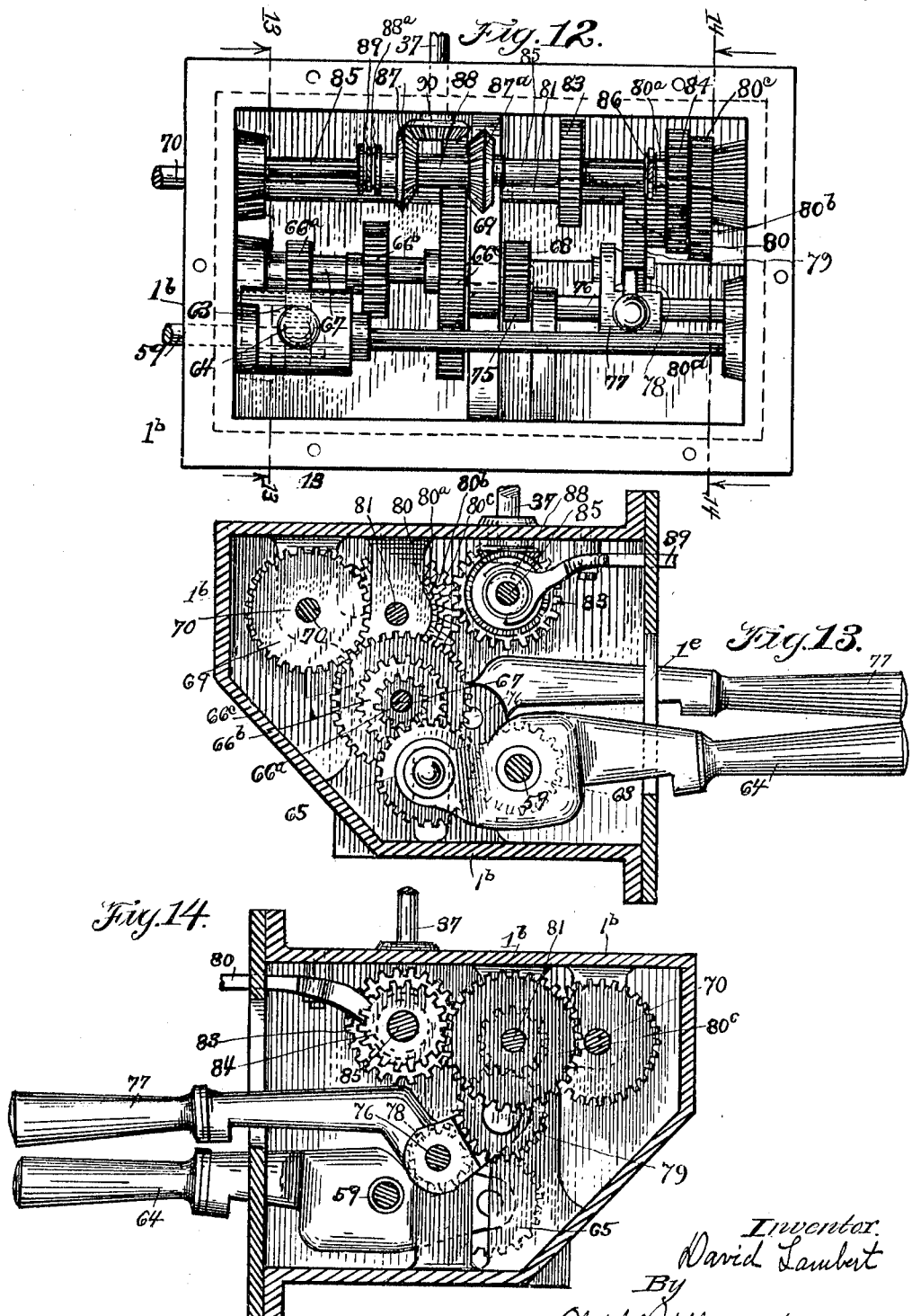

D. LAMBERT.
MACHINE TOOL.
APPLICATION FILED JULY 13, 1918.
1,316,961.
Patented Sept. 23, 1919.
8 SHEETS—SHEET 6.
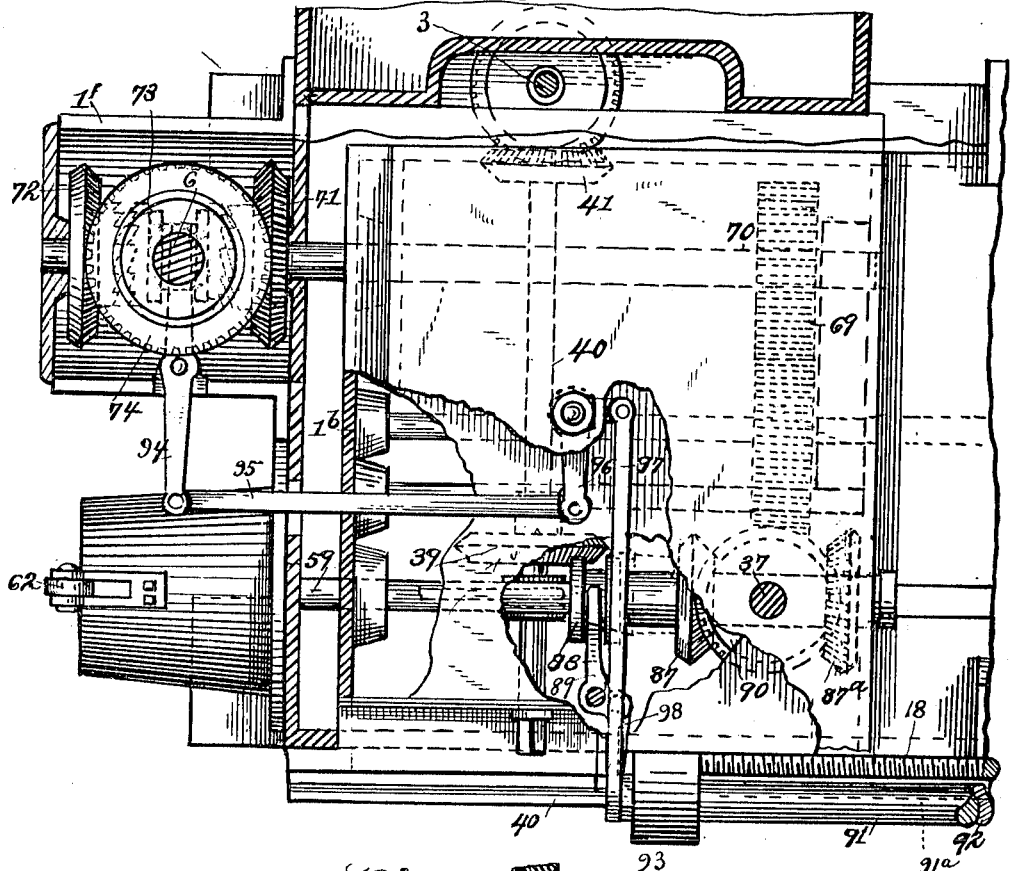
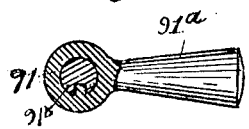
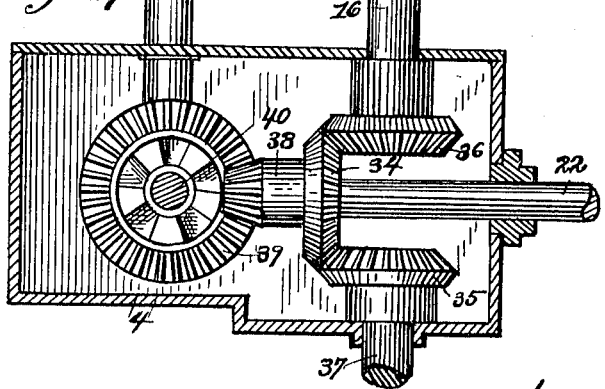
Inventor.
David Lambert
By
Chas. E. Billman Attorney.

D. LAMBERT.
MACHINE TOOL.
APPLICATION FILED JULY 13, 1918.
1,316,961.
Patented Sept. 23, 1919.
8 SHEETS—SHEET 7.
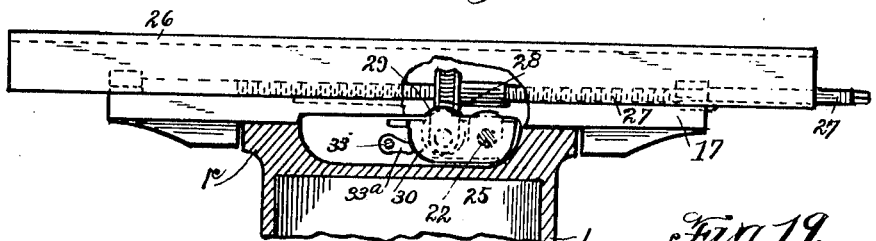
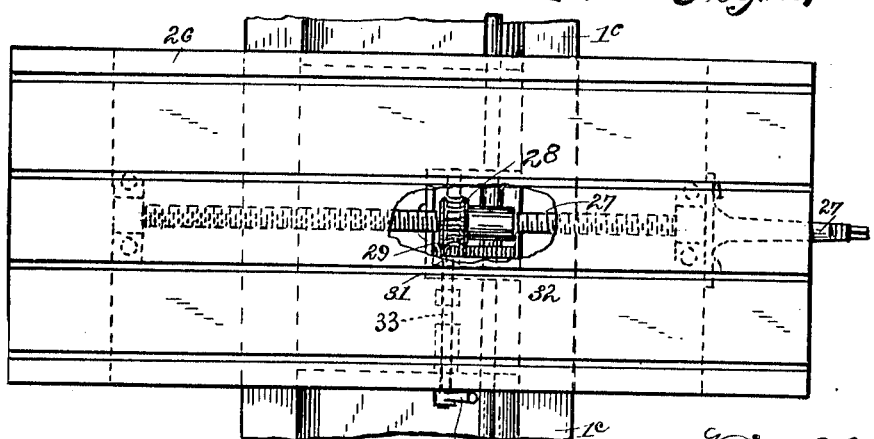
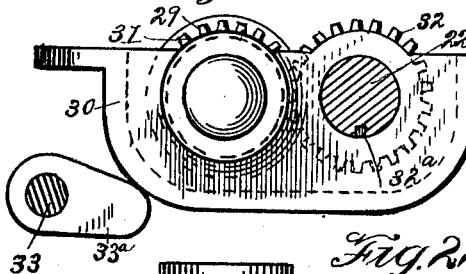
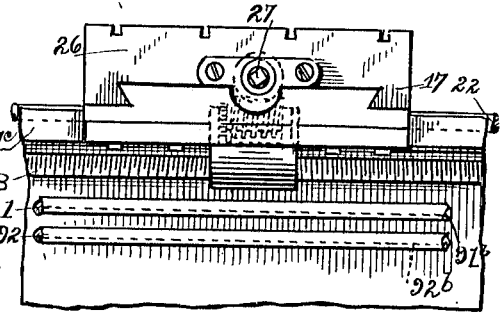
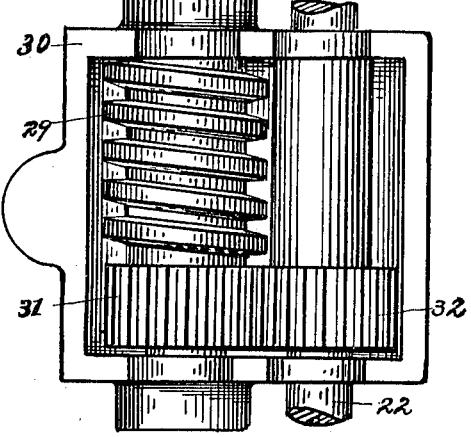
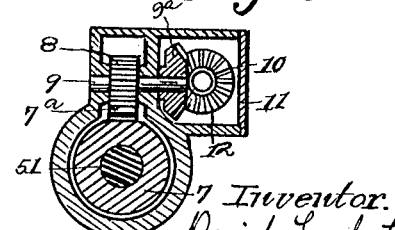
Inventor.
David Lambert
By
Fred C. Hillman Attorney.

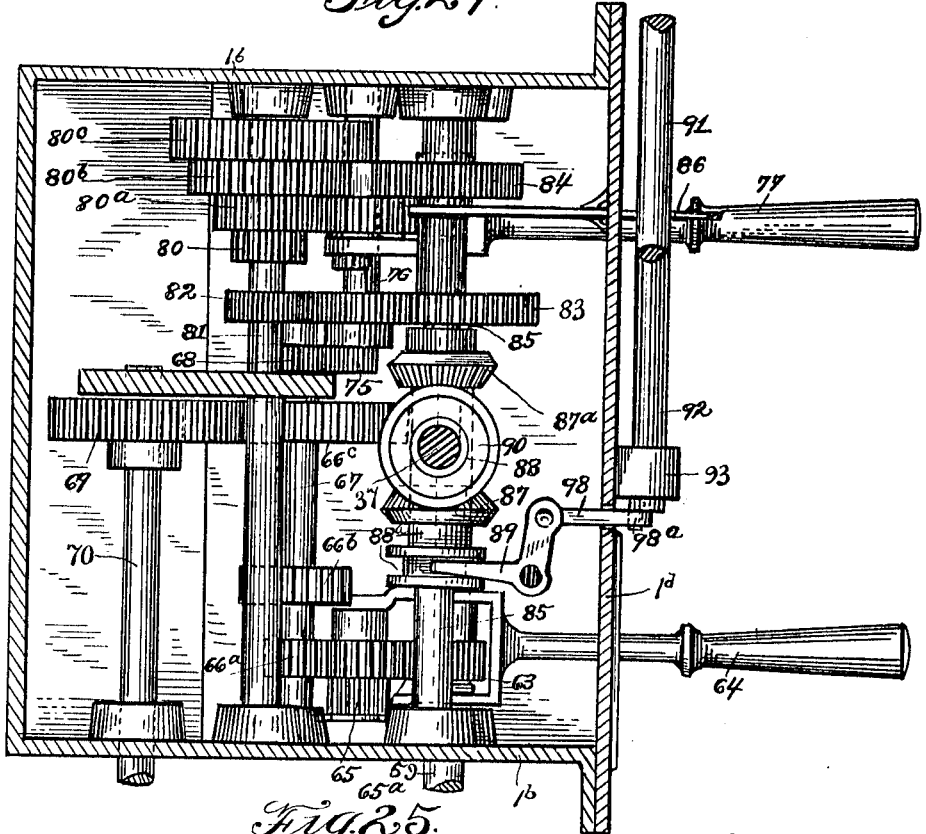
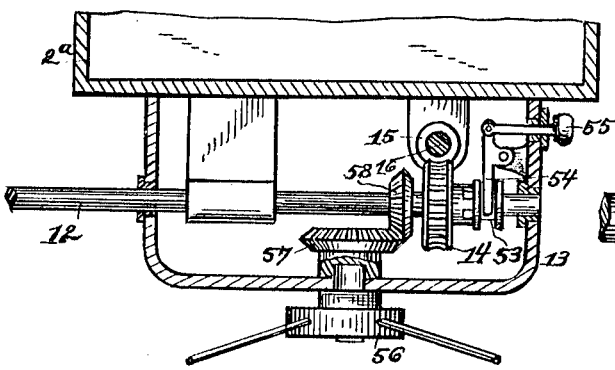
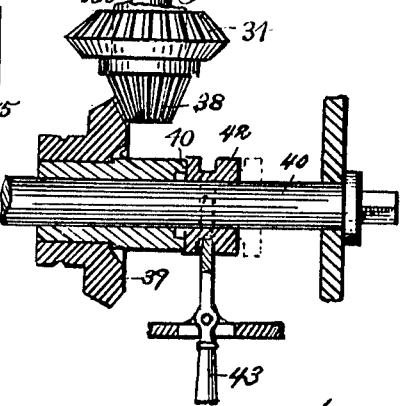

UNITED STATES PATENT OFFICE.

DAVID LAMBERT, OF CLEVELAND, OHIO, ASSIGNOR TO THE LAMBERT MACHINE & ENGINEERING COMPANY, OF CLEVELAND, OHIO, A CORPORATION.

MACHINE-TOOL.

1,316,961.     Specification of Letters Patent.     Patented Sept. 23, 1919.

Application filed July 13, 1918. Serial No. 244,771.

*To all whom it may concern:*

Be it known that I, DAVID LAMBERT, a citizen of the United States, residing at Cleveland, in the county of Cuyahoga and State of Ohio, have invented certain new and useful Improvements in Machine-Tools, of which the following is a specification.

My invention relates to improvements in tools, and more particularly to combined boring, drilling and milling machines, the machine being particularly designed and adapted for use in boring, drilling and milling capacities in machine tool work.

The primary object of the invention is to provide a generally improved machine of this class which will be exceedingly simple in construction, cheap of manufacture, and efficient in use.

A further and very important object of this invention is to provide improved gear and feed control mechanism adjustable and operable from any common and desired point by a single operator stationed in suitable proximity to the work carried upon the adjustable platen or table and whereby such single operator may feed all the various working parts either singly or simultaneously, as desired, to meet the varying demands and exigencies of actual service, the machine being of particular advantage in large work, or especially where the work carrying table or platen is somewhat removed or spaced from the main actuating gearing and spindle carrying head of the machine, whereas in machines of this general class or type now in common use two operators are frequently required, one being stationed near the work and the other near the head of the machine to receive instructions from the primary operator, this method of operation resulting in obvious disadvantages well known to those skilled in the art to which this invention appertains.

With the above mentioned and other objects in view, the invention consists in the novel construction, arrangement, and combination of parts, hereinafter described, illustrated in one of its embodiments in the accompanying drawings, and particularly pointed out in the appended claims.

Referring to the accompanying drawings, forming a part of this specification. Figure 1, is a front elevation of a machine constructed in accordance with this invention, the spindle being equipped with a milling cutter and being shown in use as a milling machine.

Figure 2:
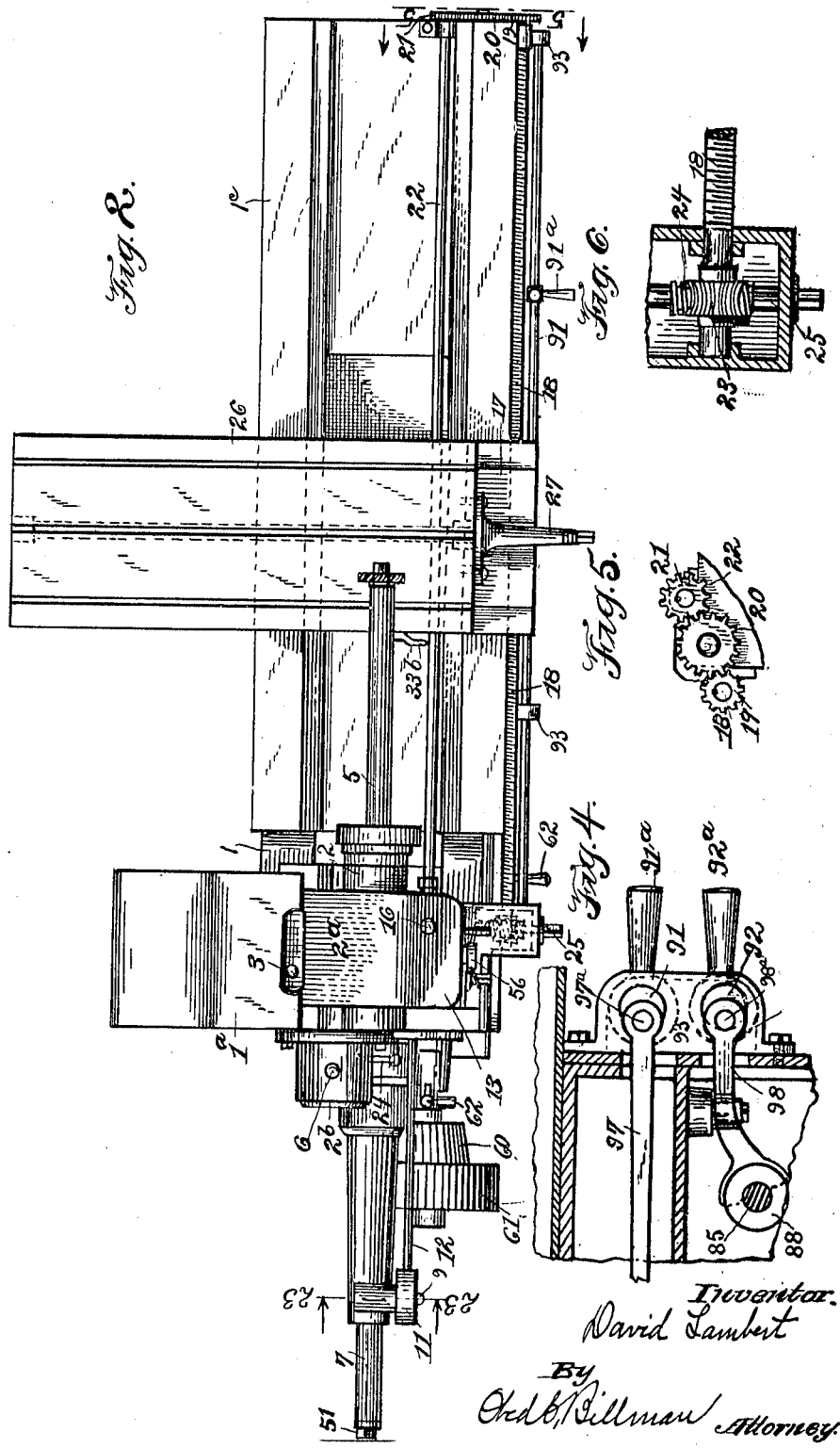

Fig. 2, a top plan view of the same.

Figure 3:
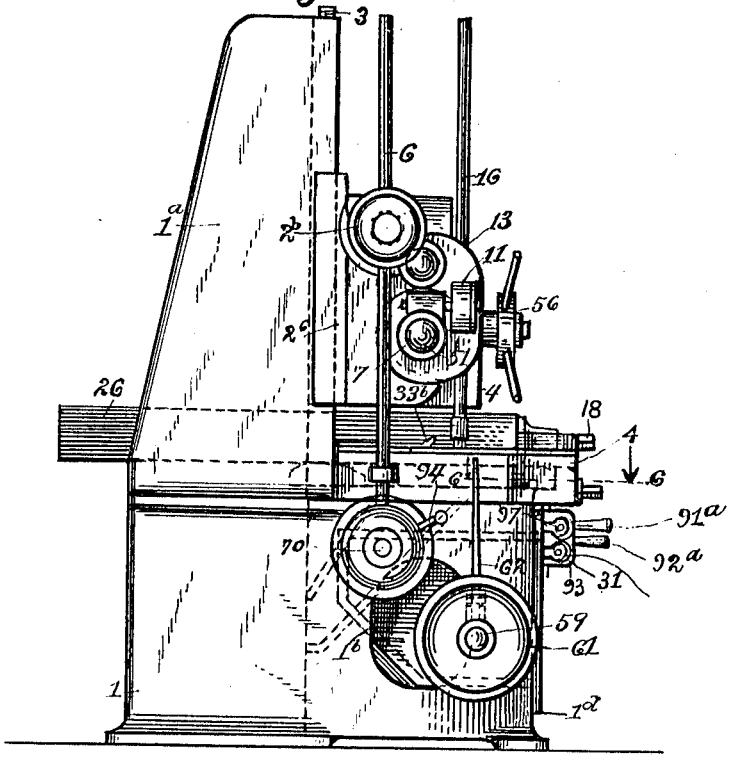

Fig. 3, an end elevation of the same, taken from the power or head end of the machine.

Fig. 4, an end elevation, partly in fragmentary section through the gear casing on substantially the line 4—4, of Fig. 1, and illustrating in particular the ends of the gear control rock shaft and adjustable operating handle at the front of the machine bed and the eccentrically connected links and levers leading from said shaft to the gearing.

Fig. 5, an end view of the feed screw and shaft connecting gearing at the end of the machine bed, taken on line 5—5, of Fig. 2.

Fig. 6, a fragmentary sectional and plan view of the manually operable gearing at the head end of the feed screw at the front of the machine.

Figure 7:
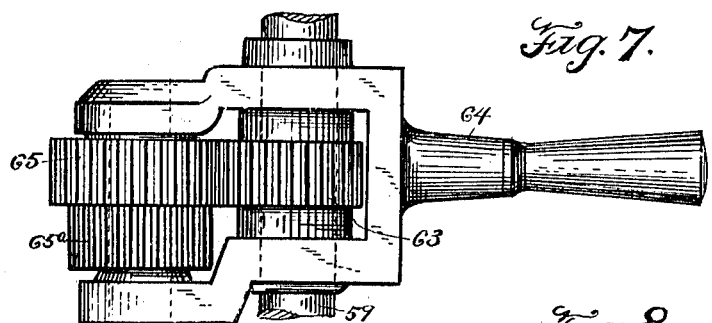

Fig. 7, a detailed top plan view of one of the shiftable change gear levers detached from the gear box or casing.

Figure 8:
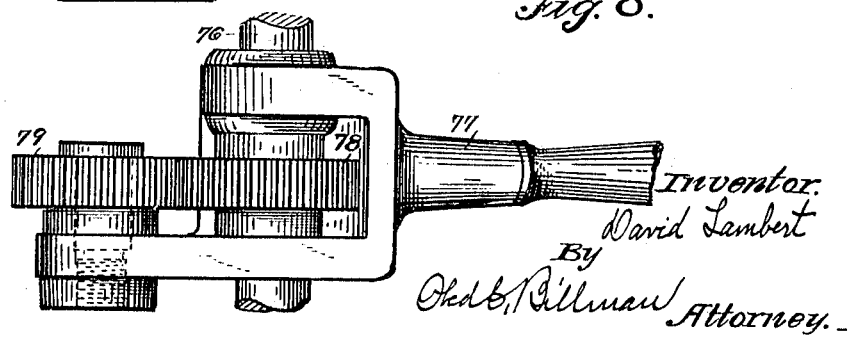

Fig. 8, a similar view of a second change gear lever, detached.

Fig. 9, a central longitudinal sectional view of the spindle and spindle carrying head and the feed and actuating gearing therefor.

Fig. 10, a fragmentary front elevation and sectional view of the same.

Fig. 11, a central vertical sectional view of the spindle carrying head and gearing for raising and lowering the same.

Fig. 12, a front elevation of the change gearing, the gearing box or casing being removed from the machine body and the casing cover being removed for the purpose of clearer illustration of the parts.

Fig. 13, a cross sectional view of the same, taken on line 13—13, of Fig. 12.

Fig. 14, a cross sectional view taken on line 14—14, of Fig. 12.

Fig. 15, a horizontal sectional view of the gear or head end of the machine the driving pulley being removed and the top gear box and gearing therein shown in Fig. 17, being removed and a portion of the intermediate horizontal walls being broken away for the purpose of clearer illustration of the parts.

Fig. 16, a detailed cross sectional view of one of the gear control rock shafts and the adjustable operating handle carried thereby.

Fig. 17, a transverse sectional view of the top gear box and gearing therein above the change gearing and casing, shown most clearly in Figs. 12 to 15, inclusive.

Fig. 18, a view, partly in section and partly in side elevation, of the machine bed, carriage, and table or platen, and illustrating the longitudinal and cross feeding mechanism for the latter, certain parts being broken away for the purpose of clearer illustration.

Fig. 19, a top plan view of the same.

Fig. 20, a detailed end elevation of the table and the subjacent gearing for operating the same.

Fig. 21, a detailed view of the table, cross or transverse feed gear and the movable gear casing and operating device for throwing said feed gear into and out of engagement with the table cross feed screw.

Fig. 22, a detailed top plan view of the same.

Fig. 23, a cross sectional view of the spindle feed gearing and rack taken on line 23—23, of Fig. 2.

Fig. 24, a horizontal sectional view of the gear casing or box, the internal gearing being shown in top plan.

Fig. 25, a horizontal sectional view of the front gear box and internal spindle feed gearing carried by the spindle carrying head, taken on line 25—25, of Fig. 11.

Fig. 26, a fragmentary sectional view of the manually operable gearing and the clutch in the front portion of the gear casing for manually raising and lowering the spindle carrying head.

Similar numerals of reference designate like parts throughout all the figures of the drawings.

The machine comprises a suitable frame or supporting base 1, provided at one end with a vertical guide head or column 1ª, and a suitable gear box or casing 1ᵇ, and having a supporting bed 1ᶜ, extending horizontally therefrom.

The gear box or casing 1ᵇ, in the present instance, is removably mounted in a suitable opening in the frame or base 1, and is provided with a removable cover 1ᵈ, said cover being provided with stepped slots 1ᵉ, to receive and coöperate with suitable gear shift levers hereinafter described.

The guide head or column 1ª, is provided with a suitable saddle or spindle carrying head 2, adapted to be raised and lowered through the medium of the screw 3, leading to the gear or distribution box 4, below and communicating with the gearing, as hereinafter described.

The spindle 5, is suitably mounted and is driven in either direction, as desired, by means of suitable gearing, hereinafter more fully described, located in the gear box 2ª, of the saddle or head 2, said gearing in the gear box 2ª, being operatively connected to a driving shaft 6, leading also to the gearing below, as hereinafter described, and the spindle 5, is advanced and retracted through the medium of a sleeve 7, provided with a rack 7ª, and operated by a pinion 8, (see Figs. 9 and 23) mounted on a shaft 9, provided with a bevel gear 9ª, meshing with a second bevel gear 10, the gears 9ª, and 10, being mounted in a casing or housing 11, and the gear 10 being mounted on a longitudinally extending shaft 12, extending into a second gear box 13, (see Fig. 11) said shaft 12, being provided with a worm gear 14, meshing with a worm 15, mounted on a vertical shaft 16, leading downwardly to the gear or distribution box 4, and being there connected to a gearing, as hereinafter fully described.

The bed 1ᶜ, is provided with a longitudinally movable carriage 17, said carriage being movable by means of the screw 18, mounted in suitable bearings on a carriage bed, said screw being provided with a pinion 19, meshing with a second pinion 20, (see Fig. 5), the pinion 20, meshing with a third pinion 21, the latter being mounted on a shaft 22, mounted on suitable bearings on the bed, and extending inwardly to the gear or distribution box 4, where it receives its motion from the gearings, as hereinafter referred to. One end of the screw 18, is provided with a worm gear 23, (see Fig. 6) meshing with a worm 24, on a shaft 25, the latter projecting in front of the distribution box and being adapted to be operated manually by a suitable wrench or operating crank when it is desired to move the carriage longitudinally through such manually operating mechanism, instead of through the gearing in the gear or distribution box, and connected as hereinafter described.

The carriage 17, is provided with a platen or table 26, mounted in suitable guide ways on the carriage and adapted to be moved transversely of the bed and upon the table by means of a screw 27, and as a means of automatically moving such platen or table 26, transversely (as for example in milling operations) the screw 27, is provided with a worm gear 28, (see Figs. 18 to 22, inclusive) meshing with a worm 29, carried in a movable box 30, said box 30, being mounted on shaft 22, and said worm 29, being provided with a pinion 31, meshing with a pinion 32, on the shaft 22, said pinion 32, being provided with a key 32ª, arranged to slide in the key way or spline of the shaft 22, (see Fig. 21). As a means of throwing the worm 29, into and out of engagement with the worm gear 28, the lower side of the carriage is provided with a shaft 33, having a finger or arm 33ª, in operative contact with the free side of the movable box 30, and actuating the latter in a well known manner through the medium of the handle 33ᵇ.

The driving shaft 22, extends into the service or distribution box 4, and receives its motion through the medium of a bevel gear 34, meshing with a bevel gear 35, below, and meshing with a second bevel gear 36, above, (see Fig. 17) the bevel gear 36, being connected to the shaft 16, which extends upwardly through the gear box 13, and is provided with the worm 15. The bevel gear 35, is connected to a shaft 37, extending below into the gear box or casing 1ᶜ, and receiving its motion from the gearing, as hereinafter described, and the bevel gear 34, is provided with a pinion 38, (see Figs. 17 and 26) meshing with a bevel gear 39, mounted on a transverse horizontally extending shaft 40, said shaft 40, extending rearwardly and being provided with a second bevel gear 41, attached to the vertical screw 3, for elevating and depressing the saddle or spindle carrying head 2, hereinbefore referred to.

As a means of throwing the shaft 40, out of engagement with the gears whereby said shaft 40, may be manually operated for the manual raising and lowering of the saddle or head 2, the shaft 40, is provided with a keyed or splined clutch sleeve 42, (see Fig. 26) adapted to be thrown out of engagement with the bevel gear 39, to the dotted line position by means of the shift lever 43.

Referring now to the mechanism for driving the spindle 5, (see Figs, 9, 10 and 11) it will be seen that the vertical driving shaft 6, is provided with a bevel gear 44, keyed or splined upon the shaft and arranged within the gear housing 2ᵇ, said bevel gear 44, meshing with a second bevel gear 45, mounted on a horizontal shaft 46, said shaft 46, being provided with a gear-wheel 47, meshing with a second gear-wheel 48, and the gear-wheel 48, meshing with a gear-wheel 49, on the spindle 5. The wheel 49, is splined upon the spindle 5, so that the latter may be fed forwardly or retracted by the mechanism hereinbefore referred to, and the spindle 5, is rotatably secured to the longitudinally movable sleeve 7, by being mounted upon a bar 50, the latter being threaded to the end of a second bar 51, rotatably mounted in the sleeve 7, and it will also be observed upon reference to Fig. 9, of the drawings, that the rear end of the spindle 5, and the adjacent or forward end of the sleeves 7, are provided with thrust ball bearings 52. The bar 50, is held in proper relative position in the sleeve 7, by means of a collar having a square or angular shaped head, designated by the numeral 51, in Fig. 2, of the drawings.

As a means of enabling the spindle 5, to be moved manually the worm gear may be disconnected from the shaft 12, by means of a clutch sleeve 53, (see Fig. 25) operated by means of a shift lever 54, connected to a slide 55, it being obvious that when the worm gear is out of engagement with the shaft 12, that the latter may be manually turned by means of the armed wheel 56, provided with a bevel gear 57, meshing with a second bevel gear 58, on shaft 12, as shown most clearly in Fig. 25, of the drawings.

Referring now to the changeable gearing within the gear box or casing 1ᵇ, by means of which motion is imparted to the various parts hereinbefore referred to, it will be seen that one end of the base or bed 1, is provided with a driving shaft 59, provided with a clutch 60, and a pulley 61, said clutch 60, being adapted to be thrown into engagement with the pulley 61, through the medium of a shift lever 62.

As a means of transmitting motion to the various parts through the driving shaft 59, the driving shaft 59, in the casing is provided with a flanged longitudinally shiftable gear 63, carried by a gear shift tumbler lever 64, and the body of the said tumbler lever is provided with a second gear 65, having a smaller gear 65ª. The gears 65 and 65ª, are adapted to be thrown into mesh with a plurality of stepped or graduated gears 66ª, 66ᵇ, and 66ᶜ, arranged on a second shaft 67, the latter shaft being provided with a pinion 68, at its end. The gear 66ᶜ, meshes with a gear 69, on a shaft 70, at the rear of the gear casing, said shaft 70, is provided with two bevel gears 71 and 72, loosely mounted thereon within a gear housing 1ᶠ, of the machine frame or base, said gears 71 and 72, being adapted to be alternately thrown into operation or engagement with the shaft by means of a shiftable splined clutch 73, for the purpose of giving alternate and opposed motion to the bevel gear 74, on the shaft 6, and for the purposes hereinafter referred to. The splined clutch 73, is also mounted in such a manner that when moved to a neutral position, as shown in Fig. 15, of the drawings, it will be out of engagement with the gears 71 and 73, and thus no motion imparted to such gears and the bevel gear 74, and the shaft to which it is attached.

The pinion 68, on the shaft 67, meshes with a second pinion 75, on a shaft 76, and the shaft 76, is provided with a second change gear tumbler lever 77, said second tumbler lever 77, being provided with a pinion 78, splined on the shaft 76, the pinion or gear 78, meshing with a second pinion 79, and said second pinion 79, being adapted to be selectively brought into mesh with any of the four gears 80, 80ª, 80ᵇ, and 80ᶜ, on the shaft 81, said shaft 81, being provided with a pinion 82, adapted to mesh with the large gear 83, said gear 83, being provided with a hub portion terminating in a second gear or pinion 84, said hub carrying the gears 83 and 84, being splined upon a shaft 85, and the gears 83 and 84, being adapted to be simultaneously shifted whereby the large gear 83, is brought out of mesh with the pinion 82, and the small gear 84, is brought into mesh with the gear 80°, or vice versa, by means of a shifting lever 86, operating in a well known and understood manner.

The shaft 85 is provided with a pair of bevel gears 87, and 87ª, mounted on a flanged sleeve 88, so as to be simultaneously actuated with the latter, and the sleeve 88, is provided with a groove 88ª, adapted to be actuated by a shift lever 89, connected as hereinafter described, said bevel gears 87 and 87ª, being adapted to be alternately brought into engagement with the bevel gear 90, at the lower end of the shaft 37, said shaft 37, entering the lower side of the gear box 4, and transmitting motion to the driving shaft 22, through the bevel gear 34, said bevel gear 34, transmitting motion to the bevel gear 36, and the shaft 16, and the pinion 38, transmitting motion to the bevel gear 39, on the shaft 40, (see Fig. 17) leading to the vertical screw 3, as hereinbefore referred to.

Referring now to my improved gear and feed control mechanism adjustable and operable from any common and desired point by a single operator stationed in suitable proximity to the work carried upon the adjustable platen or table, and whereby such operator may operate and feed all the various working parts either simultaneously or singly, as desired, it will be seen that I provide two rock shafts 91 and 92, extending longitudinally of and mounted upon the front face of the machine bed in suitable bearings 93, (see Fig. 1) each of said shafts 91 and 92, being provided with operating handles 91ª and 92ª, respectively, longitudinally slidable on the shafts, so that the same may be readily moved to correspond with the position of the table 26, or work being operated upon, and in suitable proximity to the operator. Each shaft is preferably provided with a longitudinal groove or spline 91ᵇ and 92ᵇ, to receive a key or flange on the sleeve portion of the handle, as shown most clearly in Fig. 16, of the drawings.

When the handles 91ª and 92ª, extend substantially horizontal, as shown most clearly in Figs. 1 and 3, of the drawings, the operating shafts 91 and 92, with their connections, are in a neutral position, as will be hereinafter explained.

As a means of connecting the upper rock shaft 91, to the clutch sleeve 73, whereby the latter may be either moved to a neutral position or moved from one side to the other to correspondingly actuate the driving shaft 6, and its connections, as hereinbefore referred to, the clutch sleeve 73, is provided with a shift lever 94, connected to a link member 95, the latter being connected to a crank arm 96, of a bell-crank suitably mounted, the shorter end of said bell-crank being connected to a link 97, leading to the front or face side of the machine and being eccentrically connected to the end of the rock shaft by means of a bearing pin 97ª.

Upon reference to Fig. 15, of the drawings, it will be readily understood that if the operating shaft 91, and handle 91ª, are moved to their extreme upper position, the clutch sleeve 73, will be moved to one side and thus actuate the shaft 6, and its connections, in one direction, thereby correspondingly revolving the spindle 5. When the handle 91ª, and the shaft 91, are moved to their extreme opposite or lowermost position the clutch sleeve 73, will be moved to its correspondingly extreme opposite position and the parts will be rotated and moved in an opposite direction.

Referring now to the second or lower shaft 92, and Figs. 15 and 24, of the drawings, it will be seen that the shift lever or bell-crank 89, is connected by means of a link 98, eccentrically connected by means of a bearing pin 98ª, and it will be understood that when the sleeve 88, and the bevel gears 87 and 87ª, are held in a neutral position no motion will be imparted to the bevel gear 90, and the shaft 37, leading to the shaft 16, and vertical screw 3, as hereinbefore explained, and, if moved to one of the extreme positions the parts 3 and 16, and their connections, will be moved and actuated in one direction, and if moved to the extreme opposite position, said parts will be actuated and moved in an opposite direction so that the parts 3 and 16, and their connections, may be readily actuated in accordance with the demands of the operator, thus giving the operator full and complete control of the entire machine and its parts from a single and convenient point, this arrangement resulting in obvious advantages.

From the foregoing description, taken in connection with the accompanying drawings, the operation and advantages of my invention will be readily understood.

Having thus described one of the embodiments of my invention, what I claim and desire to secure by Letters Patent, is,—

1. A machine tool, comprising a frame provided with a vertical guide head and a horizontally extending bed, a platen horizontally and transversely movable on said bed, a spindle and spindle carrying head movable on said guide head, spindle actuating gearing in said head, change gearing in said frame operatively connected to said platen and spindle and spindle actuating gearing, and gear control mechanism on said bed operatively connected to said change gearing and longitudinally adjustable with respect to said platen for controlling all of said parts through said change gearing during the operation of the latter.

2. In a machine tool, a supporting frame provided with a guide head and a bed, a head and platen on said guide head and bed, respectively, gearing carried by said frame for actuating said platen and head, a spindle carried by said head, means carried by said head for rotating and longitudinally moving said spindle and operatively connected to said gearing, and means on said bed operatively connected to said gearing for controlling said platen and head and spindle and adjustable with the movements of said platen whereby said movable parts may be operated in coöperative selective relation to each other.

3. In a machine tool, a supporting frame provided with a guide head and a bed, a head and platen on said guide head and bed, respectively, gearing carried by said frame for actuating said platen and head, a spindle carried by said head, means carried by said head for rotating and longitudinally moving said spindle and operatively connected to said gearing, and rock shafts on said bed operatively connected to said gearing for selectively changing said gearing and thereby correspondingly controlling said platen and head and spindle and having slidable handles longitudinally adjustable on said shafts with the movements of said platen whereby said movable parts may be operated in coöperative selective relation to each other.

4. A machine tool, comprising a supporting base provided with a guide column at one end and a bed extending horizontally therefrom, a carriage mounted on said bed, a platen on said carriage, a spindle carrying head movable on said guide column, a spindle mounted in said head, change gearing in said supporting base operatively connected to said head and spindle and said carriage and table for moving the same, and rock shafts on said bed operatively connected to said gearing to operate said head and spindle and said carriage and platen either singly or simultaneously in selective coöperation with each other.

5. A machine tool, comprising a supporting base provided with a gear box and a vertically extending guide standard at one end and a bed extending therefrom, a carriage and platen movable longitudinally and transversely on said bed, respectively, a spindle and spindle carrying head vertically movable on said guide standard, change gearing in said gear box operatively connected to said head and said carriage and platen, and adjustable gear control shafts and handles operatively connected to said gearing and in proximity to said carriage and platen for selectively operating said spindle and head and said carriage and platen from a point in proximity to said carriage and platen.

6. A machine tool, comprising a supporting base provided with a vertically extending guide standard and a bed extending therefrom, a carriage and platen movable longitudinally and transversely on said bed, respectively, a spindle carrying head vertically movable on said guide standard, a spindle in said head, change gearing operatively connected to said head and said carriage and platen, gear control shafts on said base in front of said bed operatively connected to said gearing and provided with sliding handles adjustable in proximity to said carriage and platen for operating said spindle and head, and said carriage and platen from a point in proximity to said carriage and platen.

7. A machine tool, comprising a frame provided with a guide column and a bed, a carriage and platen movable longitudinally and transversely on said bed, respectively, a spindle and spindle carrying head movable vertically and longitudinally on said guide column, change gearing operatively connected to said carriage and platen including a shiftable clutch and opposed gearing adapted to be alternately engaged by said clutch and a shaft operable in different directions with the shifting of said clutch and gearing and communicating with said head and spindle, and horizontal rock shafts on said frame in front of said bed operatively connected to said gearing and clutch and provided with handles adjustable in proximity to said carriage and platen for operating said spindle and head and said carriage and platen in coöperative relation to each other from a point in proximity to the latter.

8. A machine tool, comprising a frame provided with a guide column at one end and a bed extending therefrom, a carriage and platen movable longitudinally and transversely on said bed, respectively, a spindle and spindle carrying head movable on said guide column, spindle actuating gearing carried by said head, change gearing in said frame operatively connected to said carriage and platen and said spindle actuating gearing, and gear control rock shafts in front of said bed operatively connected to said change gearing and provided with handles adjustable in proximity to said carriage and platen, one of said shafts being connected to gearing leading from said change gearing, for operating said spindle and head and the other connected to gearing leading therefrom for operating said carriage and platen in coöperative relation to each other and to said spindle and head from a point in proximity to the latter.

9. In a machine tool, a frame provided with a guide column at one end and a supporting bed extending therefrom, a carriage and platen longitudinally and transversely movable on said bed, a saddle on said guide column, a spindle in said saddle, change gearing in said frame, a vertical driving shaft operatively connected to said spindle to actuate the latter, opposed gearing communicating with said shaft, a shiftable clutch for alternately operating said opposed gearing, an elevating and depressing screw connected to said saddle and said gearing, a vertical driving shaft extending through said saddle and adapted to project and retract said spindle, and means for controlling said change gearing and clutch and spindle actuating mechanism whereby to operate said saddle and spindle and said carriage and platen either singly or simultaneously in coöperative relation to each other.

10. A machine tool, comprising a frame provided with a guide column and a bed extending horizontally therefrom, a carriage and platen longitudinally and transversely movable on said bed, a saddle movable on said guide column, a vertical screw for elevating and depressing said saddle on said guide column, a spindle in said saddle, gearing in said saddle for rotating said spindle, a vertical driving shaft connected to said gearing for driving said spindle, a shiftable clutch and gearing for driving said driving shaft and spindle in different directions, means for projecting and retracting said spindle independently of said driving means, means for operating and moving said carriage and platen, change gearing for operating said means for actuating said saddle and spindle and said carriage and platen, and means for controlling said change gearing and shifting said clutch to operate said saddle and spindle and said carriage and platen, either singly or simultaneously in coöperative relation to each other.

In testimony whereof I have affixed my signature in the presence of two witnesses.

DAVID LAMBERT.

Witnesses:
O. C. BILLMAN,
H. F. STILLMAN.

Copies of this patent may be obtained for five cents each, by addressing the "Commissioner of Patents, Washington, D. C."